(12) United States Patent
Ehara et al.

(10) Patent No.: US 7,236,184 B2
(45) Date of Patent: Jun. 26, 2007

(54) EXPOSURE DEVICE AND EXPOSURE METHOD FOR EXPOSING A PHOTOSENSITIVE MEDIUM TO LIGHT ON THE BASIS OF IMAGE DATA CONTAINING MULTIPLE PIXELS

(75) Inventors: Takuji Ehara, Wakayama (JP); Fumihiro Nakahara, Wakayama (JP)

(73) Assignee: Noritsu Koki Co., Ltd., Wakayama-shi (JP)

( * ) Notice: Subject to any disclaimer, the term of this patent is extended or adjusted under 35 U.S.C. 154(b) by 468 days.

(21) Appl. No.: 10/863,528

(22) Filed: Jun. 9, 2004

(65) Prior Publication Data

US 2005/0219644 A1    Oct. 6, 2005

(30) Foreign Application Priority Data

Jun. 9, 2003    (JP)    ............... 2003-164116

(51) Int. Cl.
*B41J 2/47* (2006.01)

(52) U.S. Cl. .................................. 347/254

(58) Field of Classification Search ................ 347/240, 347/251–254, 131, 135, 144; 358/1.9, 451, 358/1.2, 3.07; 382/299–300
See application file for complete search history.

(56) References Cited

U.S. PATENT DOCUMENTS 5,515,480 A * 5/1996 Frazier ..................... 358/1.9
5,729,358 A * 3/1998 Uchiyama et al. .......... 358/451

FOREIGN PATENT DOCUMENTS

JP    10-181086 A    7/1998

* cited by examiner

*Primary Examiner*—Hai Pham
(74) *Attorney, Agent, or Firm*—Smith Patent Office (57) ABSTRACT

In an exposure device according to the present invention, a plurality of exposure bands each containing multiple dots is formed on photographic paper by repeating main scanning in a main scanning direction based on image data that contains multiple pixels and the transfer of the photographic paper in a sub scanning direction. Of the multiple dots contained in each of two continuous exposure bands, the mean value of the pixel levels of two pixels corresponding to two dots with the same positional relationship for the main scanning direction is calculated to derive interpolation data. Thus, the region between the two dots neighboring in the sub scanning direction on the photographic paper is exposed on the basis of the interpolation data.

7 Claims, 6 Drawing Sheets

FIG. 6B

EXPOSURE DEVICE AND EXPOSURE METHOD FOR EXPOSING A PHOTOSENSITIVE MEDIUM TO LIGHT ON THE BASIS OF IMAGE DATA CONTAINING MULTIPLE PIXELS

BACKGROUND OF THE INVENTION

1. Field of the Invention

The present invention relates to an exposure device and an exposure method for exposing a photosensitive medium to light on the basis of image data including multiple pixels.

2. Description of Related Art

Photographic processors that adopt what is called a digital exposure system have been recently used extensively. Such a digital exposure system is capable of forming an image by exposing photographic paper to light modulated on the basis of digital image data. The adoption of the digital exposure system allows highly flexible image processing such as color correction, density correction, and sharpening processing and also rapid additional printing, thus providing high-quality printing with high color- and density-reproducibility and high resolution.

An example of the foregoing digital-exposure photographic processors is one that adopts a scanning exposure system in which a laser beam is used for scanning through a polygon mirror etc. to expose photographic paper to light. With the scan-exposure photographic processor, photographic paper is transferred in the direction perpendicular to a main scanning direction (in a sub scanning direction) by a specified feed during one scanning or every time the laser beam is scanned across the width of the photographic paper (in the main scanning direction). The exposure processing in the main scanning direction with the laser beam and the transfer of photographic paper in the sub scanning direction are repeated to form a latent image onto the photographic paper.

With the scan-exposure photographic processor, exposure is performed such that no clearance is formed between an exposure band based on image data containing multiple pixels corresponding to one main scanning (main scanning A) and an exposure band based on image data containing multiple pixels corresponding to main scanning (main scanning B) following the main scanning A. Here, in order to prevent the occurrence of banding due to feed variations of photographic paper and improve the resolution of an image, the region in the vicinity of the boundary between the exposure band based on the main scanning A and the exposure band based on the main scanning B is sometimes exposed by a main scanning (main scanning X) based on the same image data as that corresponding to the main scanning A (for example, refer to JP-A-10 (1998)-181086). In that case, the exposure band based on the main scanning X partially overlaps with the exposure bands based on the main scanning A and the main scanning B.

When the amount of deviation in the sub scanning direction on the photographic paper between the exposure band based on the main scanning A and the exposure band based on the main scanning X is half of the amount of deviation in the sub scanning direction between the exposure band based on the main scanning A and the exposure band based on the main scanning B, the resolution in the sub scanning direction of the image formed on the photographic paper is apparently twice as high as that in the main scanning direction. At that time, little clearance is formed between the dots corresponding to the multiple pixels contained in the image data of the main scanning A and the dots corresponding to the multiple pixels contained in the image data of the main scanning B on the photographic paper, thus preventing the distortion of image due to banding.

With the scan-exposure photographic processor, for the main scanning direction, a laser beam is emitted continuously. Thus, the fluctuation in light amount among the multiple pixels arranged in the main scanning direction (the fluctuation in light amount of a laser beam when the dots corresponding to the multiple pixels are formed) is relatively gentle. On the other hand, for the sub scanning direction, the laser beam is emitted intermittently (discontinuously), Thus, the fluctuation in light amount among the multiple pixels arranged in the sub scanning direction is sharp. As a result, the difference in density between two dots corresponding to two pixels neighboring in the sub scanning direction on the photographic paper is significantly larger than that between two dots corresponding to two pixels neighboring in the main scanning direction. Accordingly, when the case in which an image is viewed along the main scanning direction and the case in which the image is viewed along the sub scanning direction are compared, an image whose edge (the difference in density among dots) is enhanced in the sub scanning direction is produced, posing the problem of decreasing image quality.

SUMMARY OF THE INVENTION

It is an object of the present invention to provide an exposure device and an exposure method in which the difference in density between two exposure regions corresponding to two neighboring pixels contained in image data can be reduced.

According a first aspect of the present invention, an exposure device for exposing a photosensitive medium to light on the basis of image data containing multiple pixels is provided. The exposure device includes a light source; a scanning mechanism for scanning on a photosensitive medium with light emitted from the light source; deriving means for deriving a pixel level between the pixel levels of two neighboring pixels contained in the image data; first control means for controlling the light source and the scanning mechanism so as to form an exposed region on the photosensitive medium by exposing the photosensitive medium to the light emitted from the light source according to the pixel level of each pixel contained in the image data; and second control means for controlling the light source and the scanning mechanism so as to expose the photosensitive medium to the light emitted from the light source according to the pixel level derived by the deriving means in the region between the centers of two exposure regions corresponding to the two neighboring pixels responsible for the derivation of the pixel level by the deriving means.

According to a second aspect of the invention, an exposure method for exposing a photosensitive medium on the basis of image data including multiple pixels is provided. The exposure method includes the steps of exposing the photosensitive medium to light emitted from a light source according to the pixel level of each pixel contained in the image data to form an exposed region on the photosensitive medium; and exposing the photosensitive medium to the light emitted from the light source according to a pixel level between the pixel levels of two neighboring pixels contained in the image data, in the region between the centers of two exposed regions corresponding to the two neighboring pixels.

With such a structure, the region between the centers of the two exposure regions corresponding to the two neighboring pixels contained in image data is exposed according to the pixel level between the pixel levels of the two neighboring pixels. This reduces the difference in density between the two exposure regions corresponding to the two neighboring pixels on the photosensitive medium. Accordingly, the quality of an image exposed on a photosensitive medium can be improved as compared with that when the region between the centers of the two exposure regions corresponding to the two neighboring pixels contained in image data is exposed according to the pixel level (including the pixel levels of the two neighboring pixels) that is not between the pixel levels of the two neighboring pixels and that when the region between the centers of the two exposure regions is not exposed under the control of the second control means.

The "light source" here can desirably emit light modulated on the basis of image data, which includes, for example, one having one light emitter capable of emitting light modulated on the basis of image data and one having a plurality of devices including a light emitter capable of emitting light that is not modulated on the basis of the image data and a modulator capable of modulating the light on the basis of the image data. The "scanning mechanism" desirably scans on a photosensitive medium to light emitted from the light source, which includes, for example, one having scanning optical devices such as a polygon mirror that shifts the light emitted from the light source in a main scanning direction and a transfer mechanism for transferring a photosensitive medium in a sub scanning direction and one having only a transfer mechanism for transferring a photosensitive medium in a sub scanning direction.

The "pixel level between the pixel levels of two neighboring pixels contained in image data" indicates a pixel level between the pixel levels of two neighboring pixels, which may be a pixel level just in the middle of the pixel levels of the two neighboring pixels (the mean value of the pixel levels of the two neighboring pixels) or a pixel level close to one of the pixel levels of the two neighboring pixels between the pixel levels of the two neighboring pixels.

The deriving means may derive the "pixel level between the pixel levels of two neighboring pixels contained in image data" according to the pixel level of any two or more pixels selected from multiple pixels contained in the image data (it may or may not include the two neighboring pixels). Accordingly, the pixel level between the pixel levels of two neighboring pixels may be derived according to only the pixel levels of the two neighboring pixels or may be derived according to the pixel levels of two or more pixels including one of the two neighboring pixels or, alternatively, may be derived according to the pixel levels of two or more pixels different from the two neighboring pixels.

The "two exposure regions corresponding to two neighboring pixels" may be disposed apart from each other or in contact with each other or partly overlap, where "the region between the centers of two exposure regions" indicates at least part of the region corresponding to the region between the centers of the two exposure regions in any of the foregoing arrangements.

The first control means and the second control means may be two different control means each having a different function or may be one control means having both of the functions.

The exposure device according to the invention may be constructed such that the light source emits a micro-diameter light beam; the scanning mechanism moves the light beam emitted from the light source in a main scanning direction and transfers the photosensitive medium along a sub scanning direction substantially perpendicular to the main scanning direction; and the deriving means derives the pixel level between the pixel levels of the two pixels neighboring in the sub scanning direction.

The exposure device according to the invention may be constructed such that the light source emits a line light beam extending in a main scanning direction; the scanning mechanism transfers the photosensitive medium along a sub scanning direction substantially perpendicular to the main scanning direction; and the deriving means derives the pixel level between the pixel levels of the two pixels neighboring in the sub scanning direction.

With such a structure, also for the sub scanning direction which is irradiated with the light intermittently (discontinuously) from the light source, the fluctuation in light amount in the regions among multiple pixels is relatively gentle. Accordingly, the difference in density between the two exposure regions corresponding to the two pixels neighboring in the main scanning direction on the photosensitive medium and the difference in density between the two exposure regions corresponding to the two pixels neighboring in the sub scanning direction can be brought close to each other. Consequently, the quality of the image formed on the photosensitive medium can be improved.

The exposure device according to the invention may be constructed such that the deriving means derives the pixel level between the pixel levels of the two neighboring pixels according to the pixel levels of the two neighboring pixels.

With such a structure, the difference in density between the two exposure regions corresponding to the two neighboring pixels on the photosensitive medium can be reduced effectively. Consequently, the quality of the image formed on the photosensitive medium can be further improved.

The exposure device according to the invention may be constructed such that the deriving means derives the mean value of the pixel levels of the two neighboring pixels as the pixel level between the pixel levels of the two neighboring pixels.

With such a structure, the difference in density between the two exposure regions corresponding to the two neighboring pixels on the photosensitive medium can be reduced more effectively. Consequently, the quality of the image formed on the photosensitive medium can be further improved.

BRIEF DESCRIPTION OF THE DRAWINGS

Other and further objects, features and advantages of the invention will appear more fully from the following description taken in connection with the accompanying drawings in which.

DESCRIPTION OF THE PREFERRED EMBODIMENT

Figure 1:
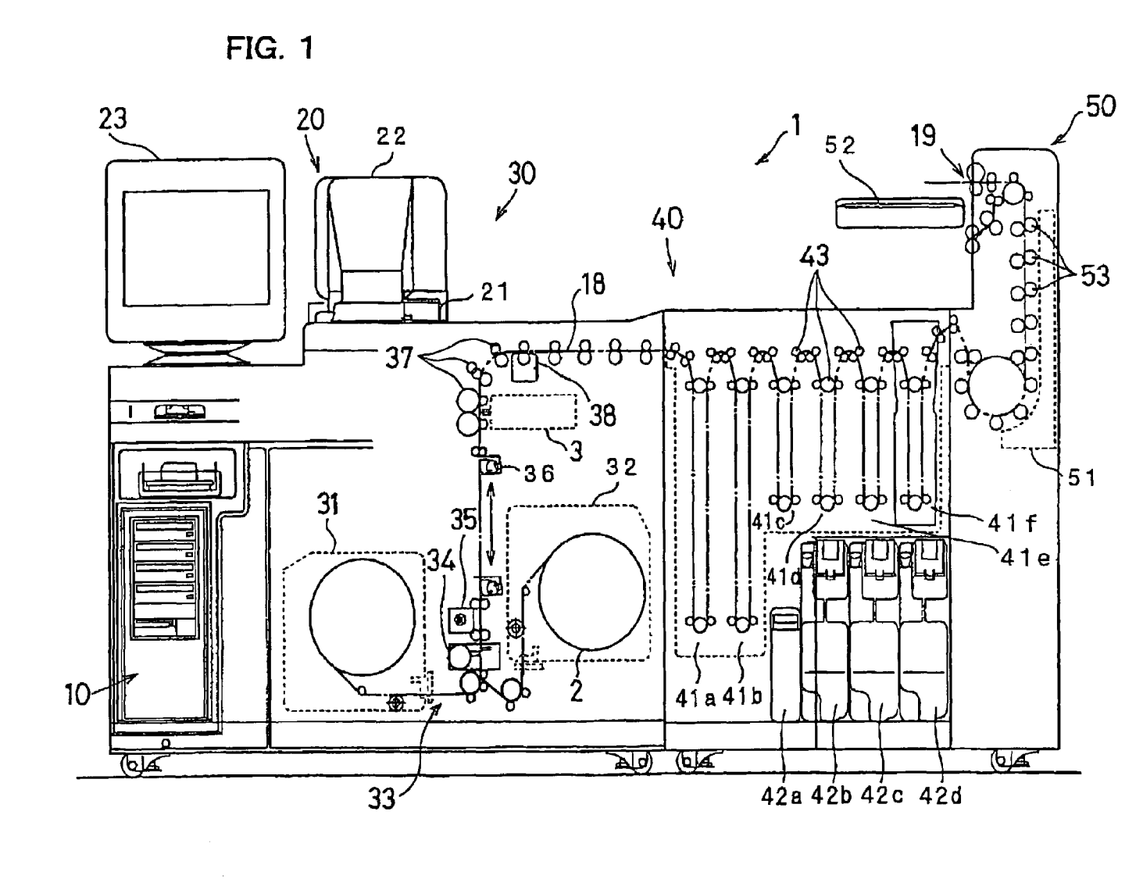
FIG. 1 is a schematic diagram of a photographic processor including an exposure device according to an embodiment of the invention.

A preferred embodiment of the present invention will be described herein below with reference to the drawings. FIG. 1 is a schematic diagram of a photographic processor including an exposure device according to an embodiment of the invention.

A photographic processor 1 shown in FIG. 1 adopts a digital-scan exposure system with a laser beam, which includes a scanner 20, a printer 30, a processor 40, and a finishing section 50. The photographic processor 1 also includes paper magazines 31 and 32. A photographic paper 2 which is a long photosensitive medium accommodated in the paper magazines 31 and 32 is transferred to a cutter 34 (described later) along a path 18 indicated by alternating long and short dashed lines in FIG. 1. The photographic paper 2 which is cut along the width into a specified length with the cutter 34 is transferred along the path 18 from the printer 30 through the processor 40 to the finishing section 50.

The scanner 20 performs various processings, principally, such as the process of reading images recorded in the frames of a film and digital conversion for the read image data. The printer 30 principally performs exposure processing for the photographic paper 2 based on the digital image data. The processor 40. performs development, decolor-fixing, and stabilizing processings for the exposed photographic paper 2. The finishing section 50 performs drying processing for the photographic paper 2 discharged from the processor 40, on which the image is developed, and sorts the photographic paper 2 which is dried and ejected from an outlet 19 in order.

The scanner 20 includes a film-loading unit 21 for loading a film and a scanner-light-source unit 22 in which a light source for irradiating the film during scanning is accommodated. Below the film-loading unit 21, an image pickup device (not shown) such as a CCD is disposed for taking a film image. An image signal outputted from the image pickup device is converted to a digital signal by an A/D converter (not shown) and then sent to an image processor 100 (described later).

The printer 30 includes the two paper magazines 31 and 32 each of which accommodates the wound long photographic paper 2 and which are used selectively, an advance unit 33 for drawing the photographic paper 2 from the paper magazines 31 and 32, the cutter 34 for cutting the specified-width photographic paper 2 drawn from the paper magazines 31 and 32 along the width into a specified length corresponding to a print size, a printing unit 35 for printing a desired character onto the surface (back) of the photographic paper 2 having no photosensitive emulsion layer, a chucker 36 for transferring the photographic paper 2 cut in a desired length to the front stage of the exposing position in two to three lines, an exposing unit 3 for applying exposure processing to the photographic paper 2, a plurality of roller pairs 37 for transferring the photographic paper 2, and a motor 38 for driving the roller pairs 37. The roller pairs 37 are arranged at intervals shorter than the shortest length of the cut photographic paper 2 to prevent the cut photographic paper 2 from dropping.

The processor 40 includes treatment tanks 41a to 41f for applying development, decolor-fixing, and stabilizing processings to the photographic paper 2 fed from the printer 30, tanks 42a to 42d for wasted treatment liquid and replenishment stored in the treatment tanks 41a to 41f, a plurality of roller pairs 43 for transferring the photographic paper 2, and a motor (not shown) for driving the roller pairs 43.

The finishing section 50 includes a heater 51 for quickly drying the photographic paper 2 ejected from the processor 40, a belt conveyor 52 for transferring the photographic paper 2 ejected from the outlet 19 vertically in FIG. 1, a plurality of roller pairs 53 for transferring the photographic paper 2, and a motor (not shown) for driving the roller pairs 53. Also the roller pairs 43 and 53 are arranged at intervals shorter than the shortest cut photographic paper 2 to prevent the cut photographic paper 2 from dropping, as are the roller pairs 37.

The photographic processor 1 shown in FIG. 1 further includes a control unit 10 for controlling the components thereof and a personal computer 25 having a display 23 which displays various information on the photographic processor 1 to inform an operator of it and a keyboard 24 (not shown) for input operation to the photographic processor 1. The control unit 10 includes the image processor 100 (refer to FIG. 3) principally for controlling image data corresponding to an image exposed to light by the exposing unit 3, as specifically described below.

Figure 2:
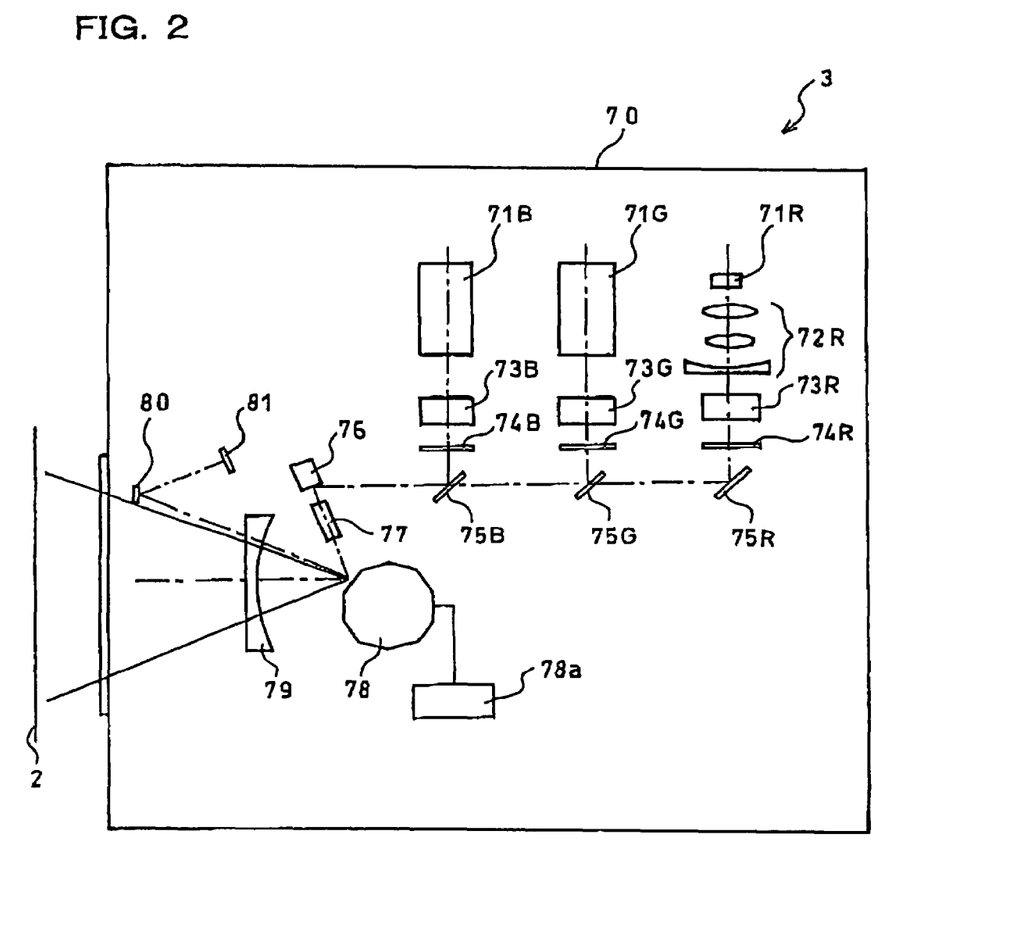
FIG. 2 is a schematic diagram of an exposing unit of the photographic processor of FIG. 1.

The detailed structure of the exposing unit 3 of the photographic processor 1 according to the embodiment will then be described. FIG. 2 shows the schematic structure of the exposing unit 3 of the photographic processor 1 of FIG. 1.

Referring to FIG. 2, the exposing unit 3 includes a blue second harmonic generation (SHG) laser unit 71B, a green SHG laser unit 71G, and a red laser diode (LD) 71R in a casing 70. The blue SHG laser unit 71B, the green SHG laser unit 71G, and the red LD 71R can emit micro-diameter laser beams of red-, blue-, and red-element wavelengths, respectively.

The blue SHG laser unit 71B and the green SHG laser unit 71G include therein a wavelength variable section (not shown) having a second harmonic generator for extracting second harmonic corresponding to a blue or green laser beam from laser beams emitted from a solid-state laser such as a YAG laser or another solid-state laser, which emits the laser beam of the second harmonic content. Although the embodiment uses the solid-state laser as means for emitting a fundamental laser beam, the invention is not limited to that but may use an LD, for example.

The red LD 71R can directly emit a red laser beam. A lens group 72R for shaping the red laser beam emitted from the red LD 71R and leading it to the inlet of the following acousto-optic modulator (AOM) 73R is disposed at the outlet of the red LD 71R. In place of the red LD 71R, a red SHG laser unit constructed as is the blue SHG laser unit 71B may be used. The intensity of the red laser beam can be modulated without providing the AOM 73R for the red LD 71R but by directly modulating the output itself from the red LD 71R.

The laser beams emitted from the blue SHG laser unit 71B, the green SHG laser unit 71G, and the red LD 71R are led to the inlets of AOMs 73B, 73G, and 73R, respectively, where the laser beams are modulated according to image data, and the light amount of the laser beams is adjusted in light control sections 74B, 74G, and 74R, respectively. In this embodiment, the blue SHG laser unit 71B, the green SHG laser unit 71G, and the red LD 71R and the AOMs 73B, 73G, and 73R are paired respectively to function as light sources.

The AOMs 73B, 73G, and 73R are light modulators that use a phenomenon of diffraction in which a refractive index distribution produced in a transparent medium by acoustic waves works as phase diffraction grating, what is called, acousto-optic diffraction, which modulate the intensity of diffracted light by varying the intensity of ultrasonic waves to be applied. Accordingly, the AOMs 73B, 73G, and 73R connect to AOM drivers 83B, 83G, and 83R (refer to FIG. 3), respectively, from which high-frequency signals whose amplitude is modulated are inputted according to image data. Then ultrasonic waves responsive to the high-frequency signals are propagated into an acousto-optic medium. When laser beams pass through the acousto-optic medium, diffraction occurs by the action of acousto-optic effects, so that laser beams with an intensity responsive to the amplitude of the high-frequency signals are emitted as refraction light from the AOMs 73B, 73G, and 73R.

The light control sections 74B, 74G, and 74R are constructed of, for example, an ND filter, a rotary plate having a plurality of openings of different sizes, etc. The range of light amount that light emitting devices such as a semiconductor laser and a solid-state laser can emit stably is predetermined. Therefore, the adjustment of light amount with the light control sections 74B, 74G, and 74R allows exposure in such a range of light amount that provides a wide dynamic range in response to the color generation characteristic of photographic paper.

The laser beams emitted from the light control sections 74B, 74G, and 74R are reflected by dichroic mirrors 75B, 75G, and a mirror 75R, respectively, toward a reflecting mirror 76. The dichroic mirrors 75B and 75G have a property of reflecting only a laser beam of a blue-element and a green-element wavelength, respectively, and transmitting light other than that. The mirror 75R may be any mirrors that reflect a red element of incident light. In this embodiment, since a red laser beam containing only a red-element wavelength is incident on the mirror 75R, a mirror that completely reflects incident light is used as the mirror 75R.

Accordingly, a red laser beam that is reflected by the mirror 75R and passes through the dichroic mirror 75G and a green laser beam that is reflected by the dichroic mirror 75G pass through the dichroic mirror 75B and reach the reflecting mirror 76. In other words, a blue laser beam that travels from the dichroic mirror 75B toward the reflecting mirror 76 becomes a combined laser beam composed of red-element, green-element, and blue-element laser beams which are modulated according to image data.

The combined laser beam is reflected by the reflecting mirror 76, passes through a cylindrical lens 77, and reaches a polygon mirror 78. The cylindrical lens 77 collects the combined laser beam reflected by the reflecting mirror 76 onto the reflecting surface of the polygon mirror 78 in the sub scanning direction. The cylindrical lens 77 corrects surface tilting error (deviation of the normal line of the reflecting surface from the normal main scanning direction) of the reflecting surface of the polygon mirror 78, if occurred (surface tilting correction).

The polygon mirror 78 is a rotary body of which a plurality of reflecting surfaces form a regular polygon and is driven for rotation by a polygon driver 78a. The combined laser beam emerging from the reflecting mirror 76 and passing through the cylindrical lens 77 is reflected by one of the reflecting surfaces of the polygon mirror 78 toward the photographic paper 2. The direction of the combined laser beam reflected by the polygon mirror 78 shifts in the main scanning direction with the rotation of the polygon mirror 78. When the reflection of the combined laser beam on one reflection surface is finished by the rotation of the polygon mirror 78, the application of the combined laser beam shifts to a reflecting surface adjacent to the reflecting surface to move the reflecting direction of the laser beam in the main scanning direction in the equal range. Thus, one scanning line is scanned on one reflecting surface and the following scanning line is scanned on the neighboring reflecting surface, allowing the time lag between the scanning lines neighboring in the sub scanning direction to be extremely reduced.

An fθ lens 79 is disposed on the optical path from the polygon mirror 78 toward the photographic paper 2. The fθ lens 79 is an optical system for correcting the distortion of the image in the vicinity of the opposite ends of the scanning surface by the combined laser beam applied to the photographic paper 2 from the polygon mirror 78 and includes a plurality of lenses. The distortion of the image in the vicinity of the opposite ends of the scanning surface occurs because of the difference in length of the optical path from the polygon mirror 78 toward the photographic paper 2.

A mirror 80 and a synchronous sensor 81 are disposed outside the main scanning range of the combined laser beam from the polygon mirror 78 to the photographic paper 2. The mirror 80 is disposed in a position just outside the starting point of the main scanning, viewed from the polygon mirror 78. In other words, the combined laser beam reflected by one reflecting surface of the polygon mirror 78 first impinges on the mirror 80 and immediately after that the photographic paper 2 is exposed in the main scanning direction.

The reflecting surface of the mirror 80 is directed to reflect the combined laser beam from the polygon mirror 78 toward the synchronous sensor 81. The length of the optical path from the polygon mirror 78 through the mirror 80 to the synchronous sensor 81 is approximately equal to that from the polygon mirror 78 to the starting point of the main scanning on the photographic paper 2.

The synchronous sensor 81 is a photosensor and is used to adjust the modulation timing of the laser beams emitted from the blue SHG laser unit 71B, the green SHG laser unit 71G, and the red LD 71R with the laser beam received from the polygon mirror 78 through the mirror 80. The synchronous sensor 81 connects to the image processor 100 (refer to FIG. 3).

Figure 3:
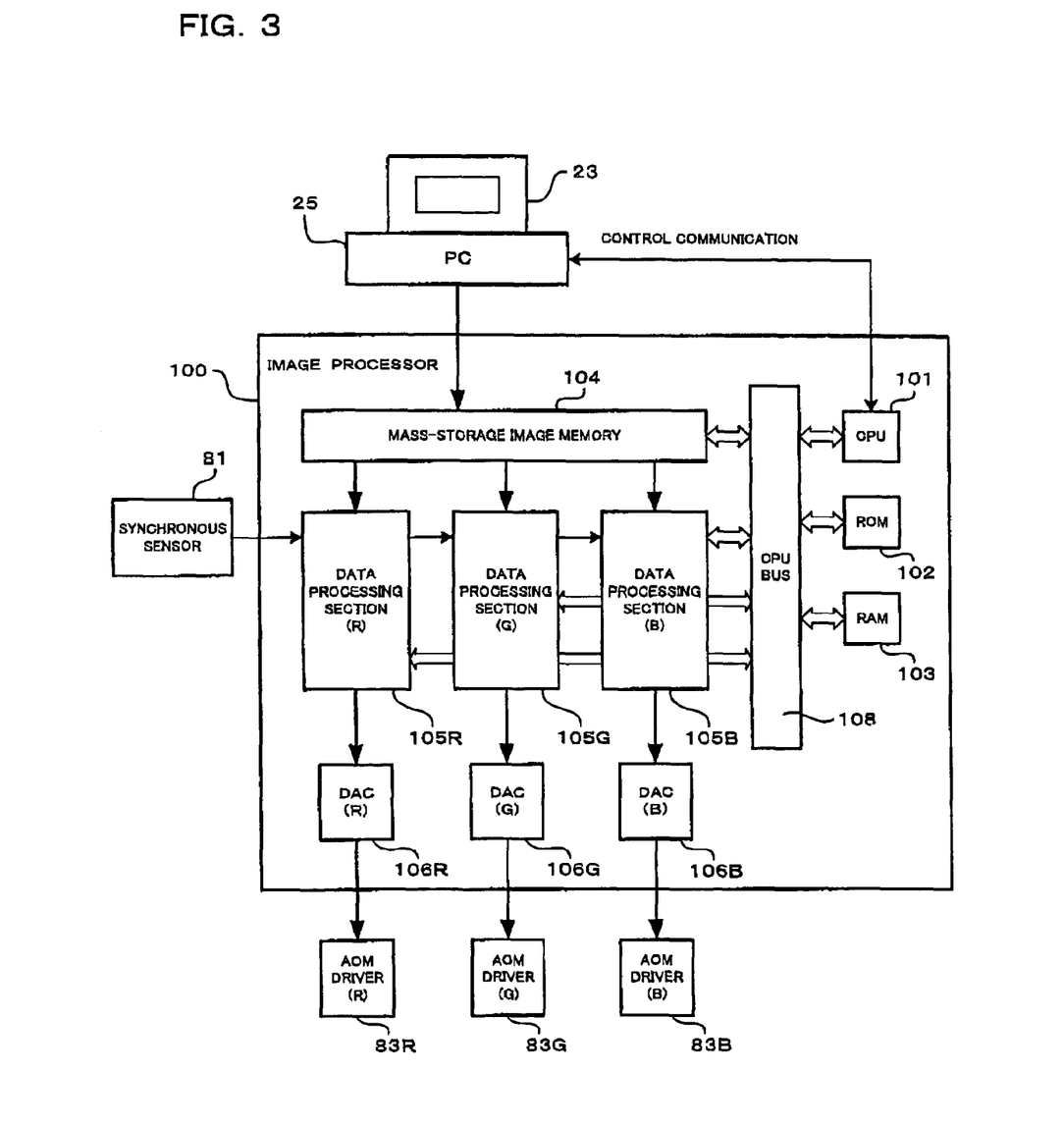
FIG. 3 is a schematic block diagram of the principal part of an image processor of the photographic processor of FIG. 1.
Figure 4:
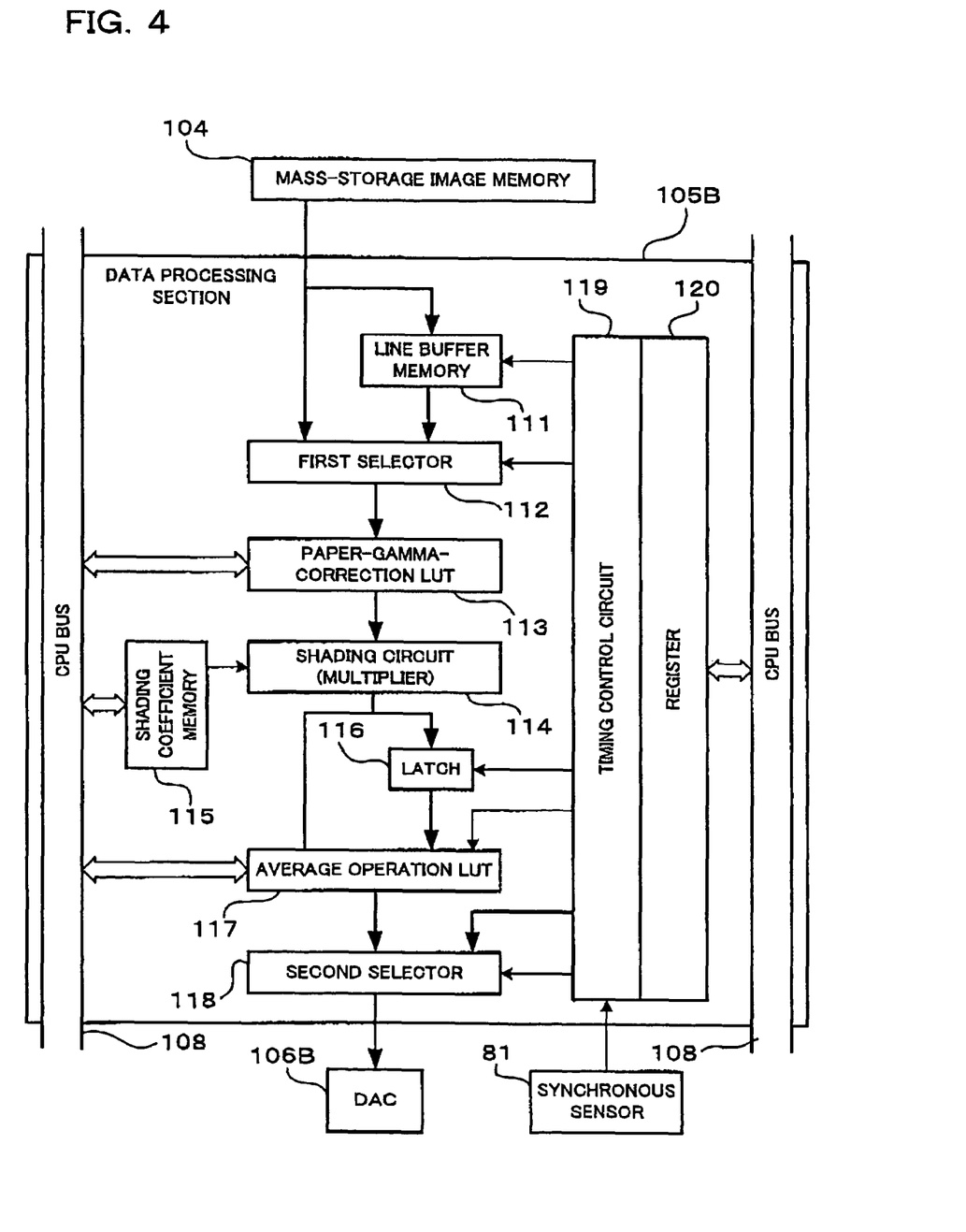
FIG. 4 is a schematic block diagram of a data processing section of the photographic processor of FIG. 1.

The schematic structure of the image processor 100 of the photographic processor 1 will now be described with reference to FIGS. 3 and 4. FIG. 3 is a schematic block diagram of the principal part of the image processor 100 of the photographic processor 1 of FIG. 1. FIG. 4 is a schematic block diagram of a data processing section of the photographic processor 1 of FIG. 1.

The image processor 100 includes a CPU 101 for executing various operations to generate signals for controlling the operation of the components of the photographic processor 1, an ROM 102 that stores control programs for the various operations and data on the photographic processor 1, an RAM 103 for temporarily storing data including operation results of the CPU 101, a mass-storage image memory 104, and data processing sections 105B, 105G, and 105R, which can transmit and receive data through a CPU bus 108. The image processor 100 further includes D/A converters (DACs) 106B, 106G, and 106R.

As shown in FIG. 3, the image processor 100 connects to the personal computer 25, AOM drivers 83B, 83G, 83R connecting to the AOMs 73B, 73G, and 73R, respectively, and the synchronous sensor 81. This allows image data to be sent from the personal computer 25 to the mass-storage image memory 104 and transmission and reception of control signals (control communication) between the personal computer 25 and the CPU 101. The data processing sections 105B, 105G, and 105R of the image processor 100 is supplied with synchronous-sensor signals from the synchronous sensor 81. The DACs 106B, 106G, and 106R can send analog signals corresponding to image data to the AOM drivers 83B, 83G, 83R.

The mass-storage image memory 104 stores the image data sent from the personal computer 25. The image data of this embodiment contains multiple pixels, each of which has a specified pixel level. The photographic paper 2 is exposed in accordance with the pixel level of each pixel, so that exposed regions (dots) corresponding to each pixel are formed on the photographic paper 2.

Considering multiple pixels contained in image data and arranged along the main scanning direction as "pixels of one line," the image data corresponding to the pixels of one line is referred to as "image data of one line." The region containing multiple dots arranged in the main scanning direction on the photographic paper 2.by being exposed according to the image data of one line is referred to as "an exposure band."

The mass-storage image memory 104 stores image data of multiple lines for forming a desired image on the photographic paper 2. The data processing sections 105B, 105G, and 105R are used to read image data of one line from the mass-storage image memory 104 as appropriate and apply various corrections (paper gamma correction and shading correction) thereto. The DACs 106B, 106G, and 106R are used to convert digital signals corresponding to image data sent from the data processing sections 105B, 105G, and 105R to analog signals.

Referring now to FIG. 4, the detailed structure of the data processing sections 105B, 105G, and 105R will be described. While FIG. 4 shows only the data processing section 105B corresponding to a blue element, the structures of the data processing sections 105G and 105R corresponding to a green element and a red element, respectively, are the same as that of the data processing section 105B. Thus, their detailed description will be omitted.

The data processing section 105B includes a line buffer memory 111, a first selector 112, a paper-gamma-correction look up table (LUT) 113, a shading circuit (multiplier) 114, a shading coefficient memory 115, a latch 116, an average operation LUT 117, a second selector 118, a timing control circuit 119, and a register 120.

The line buffer memory 111 stores image data of one line read from the mass-storage image memory 104. The line buffer memory 111 stores the image data of one line, so that the data processing section 105B can read the stored image data of one line by a necessary number of times. In this embodiment, the image data of one line stored in the line buffer memory 111 is normally read twice (corresponding to two lines).

The first selector 112 time-shares the image data read from the mass-storage image memory 104 and the image data read from the line buffer memory 111 to output it.

The paper-gamma-correction LUT 113 corrects the image data inputted from the first selector 112 depending on the chromogenic property of the photographic paper 2. Specifically, since the image data inputted to the paper-gamma-correction LUT 113 is based on the chromogenic property of the display 23 of the personal computer 25, the image data is corrected in response to the chromogenic property of the photographic paper 2. As a result, the image on the photographic paper 2 and the image on the display 23 become almost the same.

The shading circuit 114 is used for shading correction for the emission amount of the laser beams so that the amount of emission of the laser beams in the main scanning direction will be almost constant. More specifically, although the loss of light emission on one line along the main scanning direction defers depending on its position, the amount of light emission in the main scanning direction can be made almost constant by multiplying each of the amount of emission of the laser beams by a multiplier corresponding to the position of the main scanning direction.

The shading coefficient memory 115 stores the multipliers used in the shading circuit 114. The shading coefficient memory 115 stores multipliers corresponding to the position in the main scanning direction; for example, the multiplier is one in the center of one line in the main scanning direction, while the multiplier is 0.9 at the end.

The latch 116 is used to extract the image data time-shared by the first selector 112 as parallel data. Accordingly, two image data time-shaped by the first selector 112 and corresponding to different times can also be calculated in the average operation LUT 117.

The average operation LUT 117 derives interpolation data that is image data to expose the region in the vicinity of the boundary between two exposure bands continuing in the sub scanning direction on the photographic paper 2, that is, the region between dots contained in two exposure bands corresponding to image data of two lines. It can be switched by the control signal from the timing control circuit 119 whether or not an operation for deriving the interpolation data is performed in the average operation LUT 117. The average operation LUT 117 therefore does not perform the operation for deriving the interpolation data when exposure is performed in accordance with original image data (image data that is not interpolation data) but performs the operation only when exposure is performed in accordance with interpolation data.

Specifically, in the average operation LUT 117, interpolation data is calculated from image data of two lines corresponding to two times of main scanning for forming two exposure bands continuing in the sub scanning direction. In otherwords, in the average operation LUT 117, of multiple pixels contained in each of two exposure bands continuing in the sub scanning direction, the mean value of the pixel levels of two pixels with the same positional relationship for the main scanning direction (at a predetermined position from one end in the main scanning direction of multiple pixels contained in image data of each line) is calculated as the interpolation data. The operation for deriving the interpolation data in the average operation LUT 117 will be specifically described herein later, Since the data on the operation expression in the average operation LUT 117 can be rewritten by the CPU 101, the operation expression for deriving the interpolation data can be set freely.

The second selector 118 is used to switch image data to the other data. The other data includes light-intensity data etc. for irradiating the synchronous sensor 81 with a laser beam.

The timing control circuit 119 is used to control the modulation timing etc. of the laser beam according to a synchronous sensor signal sent from the synchronous sensor 81. Accordingly, the timing control circuit 119 controls the scan exposure timing of the laser beam on the photographic paper 2 as follows: in order not to form an image across the overall width of the photographic paper 2 (to form a blank at part along the width of the photographic paper 2), only the region of the photographic paper 2 where an image is to be formed is exposed by scanning with a laser beam but the region where no image is to be formed is not exposed by laser-beam scanning.

The register 120 stores various settings on image formation on the photographic paper 2 and can provide the settings to the timing control circuit 119. Examples of the settings stored in the register 120 include the total number of dots along the width of the photographic paper 2, the number of times of exposure of image data of each line (the number of times of main scanning according to image data of one line), etc.

Figure 5:
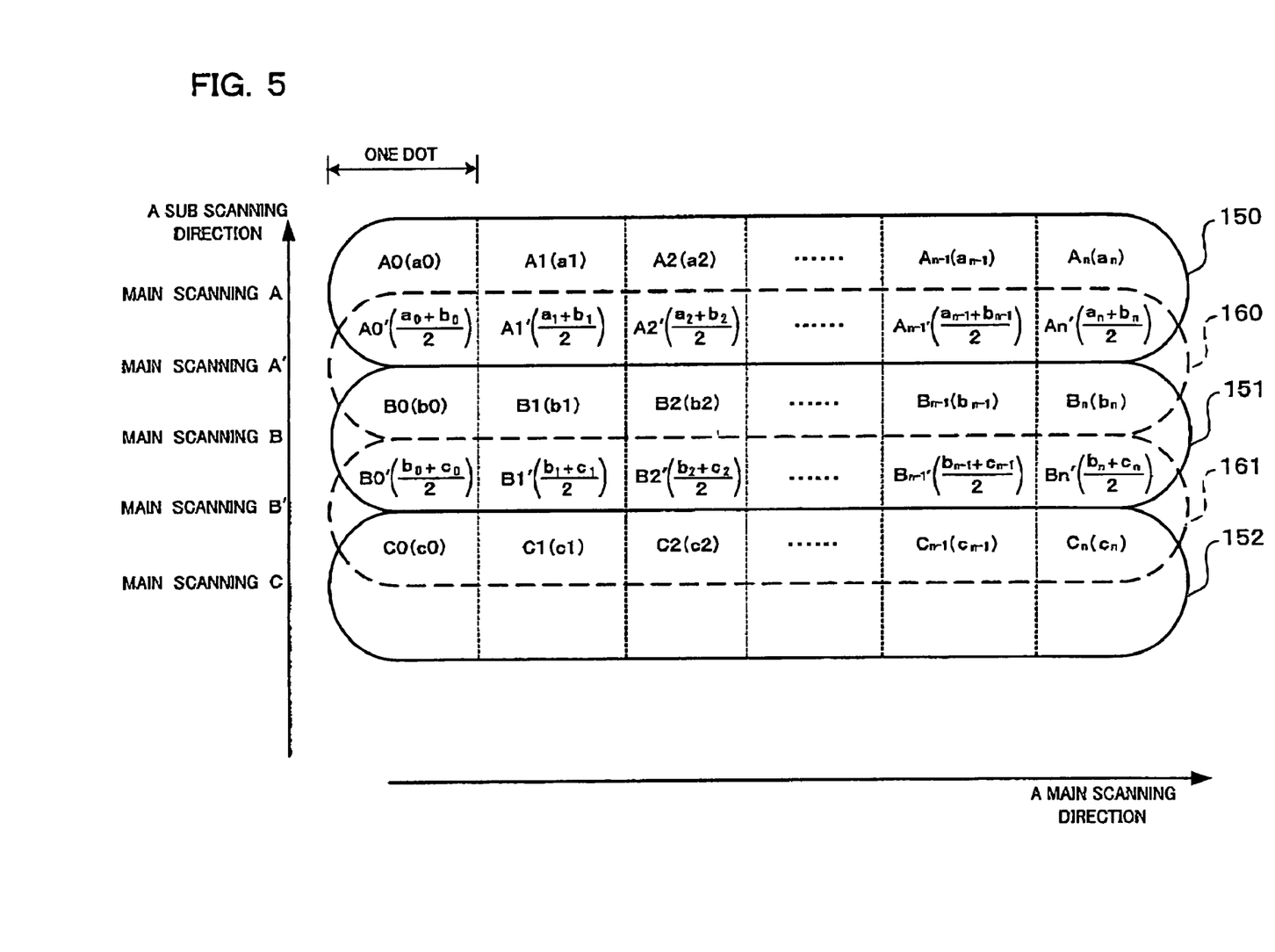
FIG. 5 is a diagram for illustrating the procedure of the exposure processing of the photographic processor of FIG. 1.

Referring now to FIG. 5, the procedure of exposure processing in the photographic processor 1 will be described. FIG. 5 is a diagram for illustrating the procedure of the exposure processing of the photographic processor 1 of FIG. 1.

FIG. 5 schematically shows exposure bands continuing in the sub scanning direction on the photographic paper 2. Here, respective exposure bands 150, 151, and 152 by main scannings A, B, and C according to original image data are indicated by solid lines, while exposure bands 160 and 161 by main scannings A' and B' based on interpolation data are shown by broken lines. The exposure bands 150 to 152 and the exposure bands 160 and 161 are arranged from an upper stream to a downstream direction in a sub scanning direction.

In FIG. 5, the exposure band 150 by the main scanning A contains multiple dots Ak (where, $0 \leq k \leq n$) arranged continuously in the main scanning direction. Specifically, the exposure band 150 contains a total number of n+1 dots, from dot A0, dot A1, dot A2, . . . , dot A(n−1) and dot An from the left to the right in FIG. 5. When the amount of the laser beam applied according to the pixel level of the pixel corresponding to dot Ak is ak, it is expressed as dot Ak(ak) in FIG. 5. The amount of the laser beam corresponding to the pixel level of the pixel contained in the image data corresponds to the density of dots formed by being exposed at the amount of the laser beam. Also the exposure bands 160, 151, 161, and 152 by the main scannings A', B, B', and C each contain the total number of n+1 dots as in the exposure band 150 by the main scanning A and the amounts of the laser beam to which they are exposed are shown as above. The shape of each dot in FIG. 5 is schematic; the actual shape may be different from that.

When a synchronous sensor signal is inputted from the synchronous sensor 81 to the image processor 100, image data of one line (image data corresponding to the main scanning A of FIG. 5, hereinafter, referred to as "image data A") is read from image data of multiple lines stored in the mass-storage image memory 104. The image data A is sent to the data processing sections 105B, 105G, and 105R downstream thereof. Here, the image data A sent to the data processing sections 105B, 105G, and 105R is then transferred to the first selector 112. At almost the same time, the image data A read from the mass-storage image memory 104 is stored in the line buffer memory 111.

The image data A transferred to the first selector 112 is further transferred to the downstream circuit, where it is subjected to paper gamma correction in the paper-gamma-correction LUT 113. The image data A is subsequently subjected to shading correction in the shading circuit 114 and then transferred to the average operation LUT 117, where exposure must be made on the basis of the original image data A. The image data A transferred to the average operation LUT 117 is thus sent to the DACs 106B, 106G, and 106R through the second selector 118 downstream therefrom without operation (without data processing).

Analog signals corresponding to the image data A are thereafter sent to the AOM drivers 83B, 83G, 83R from the DACs 106B, 106G, and 106R of the image processor 100. The AOMs 73B, 73G, and 73R are thus controlled by the AOM drivers 83B, 83G, 83R, respectively, so that the photographic paper 2 is exposed by the main scanning A based on the image data A to form the exposure band 150.

When the following synchronous sensor signal is inputted from the synchronous sensor 81 to the image processor 100, the following image data of one line (image data corresponding to the main scanning B of FIG. 5, hereinafter, referred to as "image data B") is read from the mass-storage image memory 104. The image data B is sent to the data processing sections 105B, 105G, and 105R downstream from that. The image data B sent to the data processing sections 105B, 105G, and 105R is transferred to the first selector 112. At almost the same time, the image data A which is previously stored in the line buffer memory 111 is read and transferred to the first selector 112. At almost the same time, the image data B read from the mass-storage image memory 104 is stored in the line buffer memory 111.

The image data A and the image data B transferred to the first selector 112 are time-shared and then transferred to the downstream circuit, where they are subjected to paper gamma correction in the paper-gamma-correction LUT 113. The image data A and the image data B are subsequently subjected to shading correction in the shading circuit 114 and are then inputted to the average operation LUT 117, where exposure must be made on the basis of interpolation data, not on the basis of the original image data A or image data B which are original image data. The interpolation data is therefore derived in the average operation LUT 117 on the basis of the image data A and B of two lines corresponding to two exposure bands continuing in the sub scanning direction.

More specifically, in the average operation LUT 117, as described above, the mean value of the pixel levels of two pixels with the same positional relationship for the main scanning direction is calculated as the interpolation data (image data corresponding to the main scanning A' of FIG. 5, hereinafter, referred to as "interpolation data A'") in the pixel levels of the pixels corresponding to multiple dots contained in the exposure bands 150 and 151, where the interpolation data is used to expose the region in the vicinity of the boundary between the exposure band 150 by the main scanning A and the exposure. band 151 by the main scanning B. Here, the pixel level of each pixel has a specified relationship with the light amount of the laser beam emitted when exposure is performed in accordance with each pixel level. Accordingly, in the embodiment, the mean value of the amounts of light when two pixels are exposed is calculated in place of the mean value of the pixel levels of the two pixels.

The calculation for deriving the interpolation data when the region in the vicinity of the boundary between the exposure band 150 by the main scanning A and the exposure band 151 by the main scanning B in the average operation LUT 117 is exposed will now be specifically described.

For example, the interpolation data when the region in the vicinity of the boundary between dot A0 corresponding to the pixel at one end (the left end in FIG. 5) of the exposure band 150 by the main scanning A and dot A0 corresponding to the pixel at one end (the left end in FIG. 5) of the exposure band 151 by the main scanning B on the photographic paper 2 is exposed is derived by calculating the mean value (a0+b0)/2 of a light amount a0 when a pixel corresponding to dot A0 is exposed and a light amount b0 when a pixel corresponding to dot B0 is exposed. The interpolation data when the region in the vicinity of the boundary of the second dot A1 from one end of the exposure band 150 by the main scanning A and the second dot B1 from one end of the exposure band 151 by the main scanning B is exposed is derived by calculating the mean value (a1+b1)/2 of a light amount a1 when a pixel corresponding to dot A1 is exposed and a light amount b1 when a pixel corresponding to dot B1 is exposed.

Similarly, the interpolation data when the region in the vicinity of the boundary of the kth dot Ak (where $0 \leq k \leq n$) from one end of the exposure band 150 by the main scanning A and the kth dot Bk (where $0 \leq k \leq n$) from one end of the exposure band 151 by the main scanning B is exposed is derived in the average operation LUT 117 by calculating the mean value (ak+bk)/2 of a light amount ak when a pixel corresponding to dot Ak is exposed and a light amount bk when a pixel corresponding to dot Bk is exposed. The light amount when a total of n+1 pixels corresponding to the main scanning A' are exposed is thus derived, so that interpolation data A' of one line when the vicinity of the boundary between the exposure band 150 by the main scanning A and the exposure band 151 by the main scanning B is derived.

The interpolation data A' of one line derived in the average operation LUT 117 is sent to the DACs 106B, 106G, and 106R through the second selector 118 downstream therefrom. Analog signals corresponding to the interpolation data A' are thereafter sent to the AOM drivers 83B, 83G, 83R from the DACs 106B, 106G, and 106R of the image processor 100. The AOMs 73B, 73G, and 73R are thus controlled by the AOM drivers 83B, 83G, 83R, respectively, so that the photographic paper 2 is exposed on the basis of the interpolation data A' corresponding to the main scanning A' to form the exposure band 160.

The exposure band 160 by the main scanning A' is disposed downstream in the sub scanning direction to overlap with the exposure band 150 by the main scanning A by half of the width of each region. Dot Ak' (where $0 \leq k \leq n$) contained in the exposure band 160 by the main scanning A' is formed in the vicinity of the boundary between dot Ak and dot Bk on the photographic paper 2 by being exposed at a light amount (ak+bk)/2.

When the following synchronous sensor signal is inputted from the synchronous sensor 81 to the image processor 100, image data B previously stored in the line buffer memory 111 is read and transferred to the first selector 112. At that time, the state in which the image data B is stored in the line buffer memory 111 is maintained.

The image data B transferred to the first selector 112 is further transferred to the downstream circuit, where it is subjected to paper gamma correction in the paper-gamma-correction LUT 113. The image data B is subsequently subjected to shading correction in the shading circuit 114 and then transferred to the average operation LUT 117, where exposure must be made on the basis of the original image data B. The image data B transferred to the average operation LUT 117 is therefore sent to the DACs 106B, 106G, and 106R through the second selector 118 downstream therefrom without operation (without data processing).

Analog signals corresponding to the image data B are thereafter sent to the AOM drivers 83B, 83G, 83R from the DACs 106B, 106G, and 106R of the image processor 100. The AOMs 73B, 73G, and 73R are thus controlled by the AOM drivers 83B, 83G, 83R, respectively, so that the photographic paper 2 is exposed by the main scanning B based on the image data B to form the exposure band 151.

The exposure band 151 by the main scanning B is disposed downstream in the sub scanning direction to overlap with the exposure band 160 by the main scanning A' by half of the width of each region. Therefore, the exposure band 150 by the main scanning A and the exposure band 151 by the main scanning B are arranged adjacent to each other without clearance in the sub scanning direction.

When the following synchronous sensor signal is inputted from the synchronous sensor 81 to the image processor 100, the following image data of one line (image data corresponding to the main scanning C of FIG. 5, hereinafter, referred to as "image data C") is read from the mass-storage image memory 104. The image data C is sent to the data processing sections 105B, 105G, and 105R downstream from that. The image data C sent to the data processing sections 105B, 105G, and 105R is transferred to the first selector 112. At almost the same time, the image data B previously stored in the line buffer memory 111 is read and transferred to the first selector 112. At almost the same time, the image data C read from the mass-storage image memory 104 is stored in the line buffer memory 111.

The image data B and the image data C transferred to the first selector 112 are time-shared and then transferred to the downstream circuit, where they are subjected to paper gamma correction in the paper-gamma-correction LUT 113. The image data B and the image data C are subsequently subjected to shading correction in the shading circuit 114 and are then inputted to the average operation LUT 117, where exposure must be made on the basis of interpolation data, not on the basis of the original image data B or image data C. The interpolation data is therefore derived in the average operation LUT 117 on the basis of the image data B and C of two lines corresponding to two exposure bands continuing in the sub scanning direction, More specifically, as described above, the mean value of the pixel levels of two pixels with the same positional relationship for the main scanning direction is calculated in the average operation LUT 117 as the interpolation data (image data corresponding to the main scanning B' of FIG. 5, hereinafter, referred to as "interpolation data B'") in the pixel levels of the multiple pixels contained in each of the exposure bands 151 and 152, where the interpolation data is used to expose the region in the vicinity of the boundary between the exposure band 151 by the main scanning B and the exposure band 152 by the main scanning C.

The interpolation data used to expose the region in the vicinity of the boundary between the kth dot Bk (where $0 \leq k \leq n$) from one end of the exposure band 151 by the main scanning B and the kth dot Ck (where $0 \leq k \leq n$) from one end of the exposure band 152 by the main scanning C is derived in the average operation LUT 117 by calculating the mean value (bk+ck)/2 of a light amount bk when a pixel corresponding to dot Bk is exposed and a light amount ck when a pixel corresponding to dot Ck is exposed. The light amount when a total of n+1 pixels corresponding to the main scanning B' are exposed is thus derived, so that the interpolation data B' of one line used to expose the vicinity of the boundary between the exposure band 151 by the main scanning B and the exposure band 152 by the main scanning C is derived.

The interpolation data B' of one line derived in the average operation LUT 117 is thereafter sent to the DACs 106B, 106G, and 106R through the second selector 118 downstream therefrom. Analog signals corresponding to the interpolation data B' are then sent to the AOM drivers 83B, 83G, 83R from the DACs 106B, 106G, and 106R of the image processor 100. The AOMs 73B, 73G, and 73R are thus controlled by the AOM drivers 83B, 83G, 83R, respectively, so that the photographic paper 2 is exposed on the basis of the interpolation data B' corresponding to the main scanning B' to form the exposure band 161.

The exposure band 161 by the main scanning B' is disposed downstream in the sub scanning direction to overlap with the exposure band 151 by the main scanning B by half of the width of each region. Therefore, the exposure band 160 by the main scanning A' and the exposure band 161 by the main scanning B' are arranged adjacent to each other without clearance in the sub scanning direction. Dot Bk' (where 0≦k≦n) contained in the exposure band 161 by the main scanning B' is formed in the vicinity of the boundary between dot Bk and dot Ck on the photographic paper 2 by being exposed at a light amount (bk+ck)/2.

The exposure band 152 on the photographic paper 2 is thereafter exposed on the basis of the image data C corresponding to the main scanning C, as described above. The exposing process based on the original image data (exposing process based on the main scannings A, B, and C in FIG. 5) and the exposing process based on the interpolation data (exposing process based on the main scannings A' and B' in FIG. 5) are alternately repeated (exposure process advances in the order of main scanning A→A'→B→B'→C) while transferring the photographic paper 2 by a specified feed in the sub scanning direction to form a latent image on the photographic paper 2.

Figure 6A:
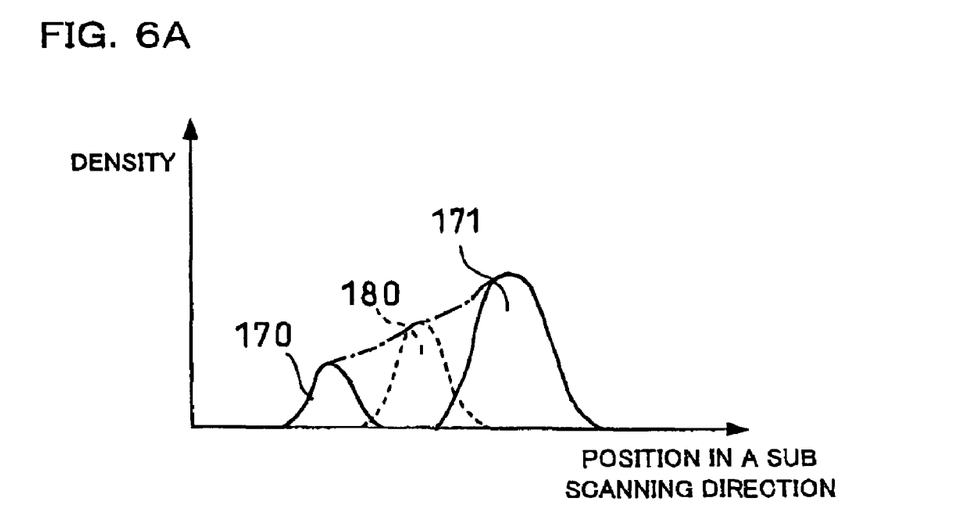
FIG. 6A is a graph of the fluctuation in density of the region between two dots neighboring in the sub scanning direction when exposed at the mean value of the light amounts when pixels corresponding to the two dots are exposed.
Figure 6B:
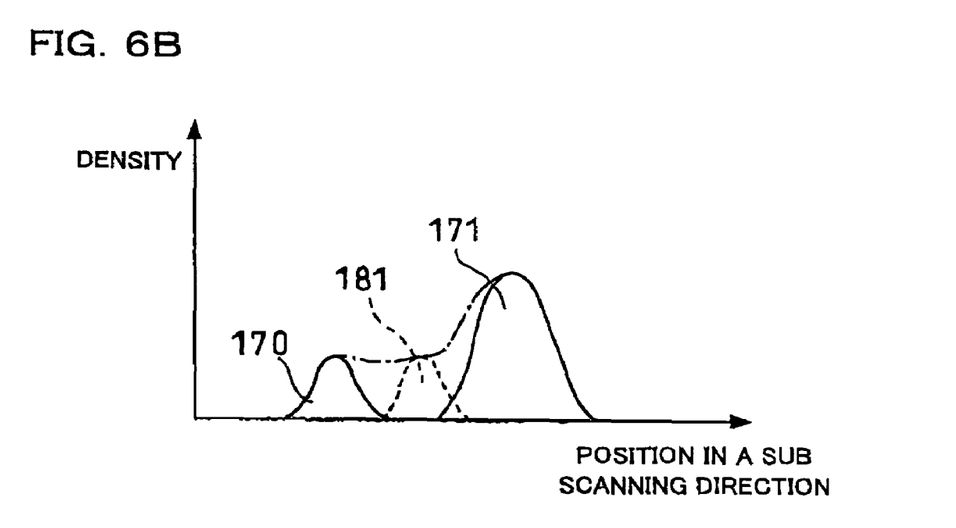
FIG. 6B is a graph of the fluctuation in density of the region between two dots neighboring in the sub scanning direction when exposed at a light amount equal to that when pixels upstream in the sub scanning direction are exposed, of the light amounts when pixels corresponding to the two dots are exposed.

Referring now to FIGS. 6A and 6B, fluctuations in density of the region between two dots neighboring in the sub scanning direction with the same positional relationship in the main scanning direction will be described for the dots contained in two exposure bands continuing in the sub scanning direction. FIG. 6A shows the fluctuation in density of the region between the two dots neighboring in the sub scanning direction when the region is exposed at the mean value of the light amounts when pixels corresponding to the two dots are exposed. FIG. 6B shows the fluctuation in density of the region between the two dots neighboring in the sub scanning direction when exposed at a light amount equal to that when pixels upstream in the sub scanning direction are exposed, of the light amount when pixels corresponding to the two dots are exposed.

FIGS. 6A and 6B show the fluctuations in density of the region between two dots 170 and 171 neighboring in the sub scanning direction. The dot 170 is disposed upstream from the dot 171 in the sub scanning direction and has a density lower than that of the dot 171. Between the dots 170 and 171, a dot 180 or 181 is formed. The dots 170 and 171 correspond to dots based on the original image data, while dots 180 and 181 correspond to dots based on interpolation data.

As clearly shown in FIGS. 6A and 6B, the density distribution for the sub scanning direction in each dot is the highest in the vicinity of the center and is lower toward the periphery. The density in the vicinity of the center of each dot corresponds to the pixel level of the pixel corresponding to the dot.

Referring to FIG. 6A, the region between the dots 170 and 171 has the dot 180 formed by being exposed at the mean value of the light amounts when two pixels corresponding to the dots 170 and 171 are exposed. Accordingly, the density in the vicinity of the center of the dot 180 is the mean value of the density in the vicinity of the center of the dot 170 and the density in the vicinity of the center of the dot 171.

Referring to FIG. 6B, the region between the dots 170 and 171 has the dot 181 formed by being exposed at a light amount equal to that when a pixel corresponding to the dot 170 is exposed. Accordingly, the density in the vicinity of the center of the dot 181 is equal to that of the vicinity of the center of the dot 170.

FIGS. 6A and 6B show the fluctuations in density of the region between the two dots 170 and 171 neighboring in the sub scanning direction by alternate short and long dashed lines. FIG. 6B shows that the fluctuation in density of the region between the dots 170 and 171 (between the dots 181 and 171) is sharp because the density of the dot 181 formed between the dots 170 and 171 is equal to that of the dot 170. On the other hand, FIG. 6A shows that the fluctuation in density of the dot 180 formed between the dots 170 and 171 is gentle because the density of the dot 180 formed between the dots 170 and 171 is the mean value of the densities of the two dots 170 and 171.

In the photographic processor 1 according to this embodiment, as described above, the exposing process with the laser beam in the main scanning direction and the transfer of the photographic paper 2 in the sub scanning direction are repeated to perform multiple times of main scanning based on image data of one line including multiple pixels, there by forming a plurality of exposure bands each containing multiple dots on the photographic paper 2. Of the multiple dots contained in each of the two exposure bands exposed on the basis of the original image data and continuing in the sub scanning direction, the mean value of the light amounts when two pixels corresponding to two dots with the same positional relationship for the main scanning direction is calculated to derive interpolation data. Thus, the region between the dots contained in the two exposure bands continuing in the sub scanning direction is exposed on the photographic paper 2, on the basis of the interpolation data. Thus the difference in density of the two dots neighboring in the main scanning direction on the photographic paper 2 and the difference in density of the two dots neighboring in the sub scanning direction can be brought close to each other. Consequently, the quality of the image formed on the photographic paper 2 can be improved.

For example, in the foregoing embodiment, the interpolation date when exposing the region around the boundary of the two dots neighboring in the sub scanning direction is derived by calculating the mean value of the pixel levels (light amounts) of the two pixels corresponding to the two dots. However, the calculation method for deriving the interpolation data can be varied freely. Accordingly, the interpolation data for exposing the region need not necessarily be calculated from the pixel levels of the two pixels corresponding to the two dots. In other words, the interpolation data for exposing the region may be derived from the pixel levels of three or more pixels contained in image data (which may or may not contain the pixels corresponding to the two dots). Consequently, in the foregoing embodiment, the interpolation data A' for exposing the region between the dots contained in the two exposure bands by, for example, the main scanning A and main scanning B may be derived from the pixel level of any pixel selected from multiple pixels contained in image data corresponding to the main scanning A, main scanning B, and main scanning C.

Even when the interpolation data for exposing the region between the two dots neighboring in the sub scanning direction is calculated from the pixel levels of the two pixels corresponding to the two dots, there is necessarily no need to derive it by equalizing the pixel levels of the two pixels corresponding to the two dots. Accordingly, the interpolation data may not contain a pixel level in the middle of the pixel levels of the two pixels corresponding to the two dots but may have a pixel level between the pixel levels of the two pixels corresponding to the two dots. Briefly, the interpolation data may have a pixel level close to one of the pixel levels of the two pixels corresponding to the two dots.

In the foregoing embodiment, although the region around the boundary of the two exposure bands to be exposed by image data of two lines and continuing in the sub scanning direction is exposed by scanning only once on the basis of one interpolation data, the region may be exposed by scanning multiple times. In other words, multiple dots based on interpolation data may be formed between two dots neighboring in the sub scanning direction. When the region is exposed by scanning multiple times, all the interpolation data used for the multiple times of scan exposure may be the same or, alternatively, different from one another. Also when a clearance is provided between the two exposure bands based on the image data of two lines or the two exposure bands based on the image data of two lines overlap, similar advantages to those of this embodiment can be offered by exposing the region between the centers thereof on the basis of the interpolation data.

While the foregoing embodiment has been described for the case in which the region between two dots neighboring in the sub scanning direction is exposed on the basis of interpolation data, similar advantages to those of the embodiment can be provided even when the region between two dots neighboring in the other direction is exposed on the basis of interpolation data. Accordingly, for example, the region between two dots neighboring along the width of photographic paper (in the main scanning direction in this embodiment) may be exposed on the basis of interpolation data.

The embodiment has been described for the case in which the exposing unit 3 includes the red LD 71R, the blue SHG laser unit 71B, the green SHG laser unit 71G which are capable of emitting a micro-diameter light beam, and the polygon mirror 78, in which a micro-diameter light beam is led onto the photographic paper 2 through the polygon mirror 78 for main scanning, and a photosensitive medium is carried in the sub scanning direction. Alternatively, the exposing unit may include a linear light emitter having a length across the width of photographic paper (for example, a light emitter using a PLZT (PbLaZrTa) device, etc.), in which a line light beam is led onto the photographic paper without passing through a scanning optical device and scans in the main scanning direction and a photosensitive medium may be transferred in the sub scanning direction.

While the foregoing embodiment has been described for the case in which three light sources corresponding to three colors are provided to form a latent image corresponding to a color image on photographic paper, one light source corresponding to one color may be provided to form a latent image corresponding to a monochrome image on the photographic paper.

While the foregoing embodiment has been described for the case in which an acousto-optic modulator (AOM) is used as a modulator for modulating a laser beam, the invention may be constructed to modulate the intensity of a laser beam by applying other modulators such as an electro-optic modulator (EOM) and a magneto-optic modulator (MOM).

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. An exposure device for exposing a photosensitive medium to light on the basis of image data containing multiple pixels, comprising:
   a light source;
   a scanning mechanism for scanning on a photosensitive medium light emitted from the light source in a main scanning direction and transferring the photosensitive medium along a sub scanning direction substantially perpendicular to the main scanning direction;
   deriving unit deriving a pixel level between the pixel levels of two neighboring pixels contained in the image data;
   first control unit controlling the light source and the scanning mechanism so as to form an exposed region on the photosensitive medium by exposing the photosensitive medium to the light emitted from the light source according to the pixel level of each pixel contained in the image data; and
   second control unit controlling the light source and the scanning mechanism so as to expose the photosensitive medium to the light emitted from the light source according to the pixel level derived by the deriving unit in the region between the centers of two exposure regions corresponding to the two neighboring pixels being substantially in the sub scanning direction that are responsible for the derivation of the pixel level by the deriving unit.

2. An exposure device according to claim 1, wherein the light source emits a micro-diameter light beam.

3. An exposure device according to claim 2, wherein the deriving unit derives the mean value of the pixel levels of the two neighboring pixels as the pixel level between the pixel levels of the two neighboring pixels being substantially in the scanning direction.

4. An exposure device according to claim 1, wherein the light source emits a line light beam extending in the main scanning direction.

5. An exposure device according to claim 4, wherein the deriving unit derives the mean value of the pixel levels of the two neighboring pixels as the pixel level between the pixel levels of the two neighboring pixels being substantially in the sub scanning direction.

6. An exposure device according to claim 1, wherein the deriving unit derives the mean value of the pixel levels of the two neighboring pixels as the pixel level between the pixel levels of the two neighboring pixels being substantially in the sub scanning direction.

7. An exposure method for exposing a photosensitive medium on the basis of image data including multiple pixels, comprising the steps of:
   exposing the photosensitive medium to light emitted from a light source according to the pixel level of each pixel contained in the image data to form an exposed region on the photosensitive medium; and
   exposing the photosensitive medium to the light emitted from the light source according to a pixel level between the pixel levels of two neighboring pixels being substantially in the sub scanning direction that are contained in the image data, in the region between the centers of two exposed regions corresponding to the two neighboring pixels.

* * * * *